United States Patent
Mercuri

Patent Number: 5,868,612
Date of Patent: Feb. 9, 1999

[54] STITCH FOR ELASTIC NETTING

[75] Inventor: Gervasio Mercuri, Glynde, Australia

[73] Assignee: Ennio Pty Ltd., Australia

[21] Appl. No.: 836,675

[22] PCT Filed: Oct. 26, 1995

[86] PCT No.: PCT/AU95/00714

§ 371 Date: Jul. 7, 1997

§ 102(e) Date: Jul. 7, 1997

[87] PCT Pub. No.: WO96/13626

PCT Pub. Date: May 9, 1996

[30] Foreign Application Priority Data

Oct. 27, 1994 [AU] Australia ............... PM 9080

[51] Int. Cl.⁶ ................................. A22C 13/00
[52] U.S. Cl. .................... 452/32; 452/30; 138/118.1
[58] Field of Search ................. 452/32, 30, 21, 452/22

[56] References Cited

U.S. PATENT DOCUMENTS

| | | |
|---|---|---|
| 1,518,798 | 12/1924 | Kendrick. |
| 2,115,627 | 4/1938 | Foster ......................... 66/189 |
| 2,922,186 | 1/1960 | Sartore ........................ 452/32 |
| 3,529,401 | 9/1970 | Sartore et al. ............... 452/32 |
| 4,036,037 | 7/1977 | Huckfeldt .................... 66/170 |
| 4,346,738 | 8/1982 | Martinek ................... 138/118.1 |
| 4,993,210 | 2/1991 | Kolcross ...................... 53/428 |
| 5,413,148 | 5/1995 | Mintz et al. .............. 138/118.1 |
| 5,709,068 | 1/1998 | Bylenga ...................... 452/32 |
| 5,712,007 | 1/1998 | Mercuri ...................... 428/34.8 |

FOREIGN PATENT DOCUMENTS

| | | |
|---|---|---|
| 443080 | 11/1967 | Australia. |
| 39915672 | 8/1971 | Australia. |
| AU-A-50660/93 | 11/1992 | Australia ............ A22C 13/02 |
| AU-A-46123/93 | 12/1993 | Australia ............ A22C 13/00 |
| 507 405 | 6/1971 | Switzerland ................ 21/18 |
| 1 368 927 | 10/1974 | United Kingdom ......... 21/12 |

Primary Examiner—Willis Little
Attorney, Agent, or Firm—Baker & Maxham

[57] ABSTRACT

The present invention provides an improved system of stitching for forming a casing of tubular netting, in which the casing comprises circumferential elastic members formed from at least one continuous spiral or a plurality of separate circular loops, and longitudinal members formed from a plurality of chain stitches interconnecting adjacent loops of the spiral or separate loops of the circumferential elastic members, resulting in a net-like appearance, the longitudinal chain stitches being attached to the circumferential elastic members such that, at each connection point of the chain stitching to an elastic member, a first chain stitch is attached to the elastic member and a further pair of chain stitches is attached to the elastic member and spaced either side of the first chain stitch such that, when the first and further pair of chain stitches are stretched, the first chain stitch is caused to pull on the section of the elastic member located between the further pair of chain stitches such that elastic deformation of the elastic member in the direction of the stretch occurs.

8 Claims, 2 Drawing Sheets

STITCH FOR ELASTIC NETTING

BACKGROUND

This invention relates to an improved tubular net for food products, and in particular relates to an improved stitch for tubular net or netting.

The present invention may find many applications, and these applications may not be limited to the food industry. However, for easy description, the invention will be described in relation to its application for use in the food industry.

In the following description, the terms "casing", "food product" and "netting" shall have the following meanings:

| | |
|---|---|
| "casing" | any synthetic or natural tubular material used in the processing of food products such as meat products, |
| "food product" | any fresh or processed food products, and in particular fresh or processed meat products, and |
| "netting" | any knitted, woven, extruded or otherwise manufactured packaging netting which is elasticated, rigid or laterally extendible. |

In the manufacture of food products, and in particular in respect of the manufacture of meat products, natural or artificial casings in the form of elongated tubes are normally either pumped full of meat from a machine specifically designed for the purpose, or have portions of meat placed within the tube prior to either a cooking or a curing process taking place.

In some cases, machines dealing with minced meat products use a feed mechanism for injecting meat through a delivery tube or injection horn where the casing is shirred onto the external surface of the delivery tube. A clip or other closure means is placed over the end of the casing, and a quantity of meat is then injected into the casing. Depending on the desired length of the meat product, the process is interrupted at various stages so that clips or twists may be applied to form separate and individual meat product portions.

In addition, whole meat portions may be inserted within tubular casing and, in this instance, stuffing tubes or horns are also used which enable the tubular casing to be stretched, whereupon meat portions can be readily introduced within the tubular casing.

In some cases, artificial skins such as collagen-based casings or fibrous casings have a tubular net or netting placed over the outside of the collagen once the food product is located within the casing. Alternatively, the food product may be inserted directly within the netting without the use of any inner casing.

In many instances, the netting is used primarily for decorative effect and remains in place prior to consumption of the food product. However, in addition to providing a decorative effect, the netting, if properly sized, can be used to produce a surface pattern effect. In this instance, the longitudinal and circumferential members of the net apply a force to the surface of the meat product and, provided that the surface of the food product is sufficiently resilient, then the netting will protrude into the surface of the food product. This results in a quilt-like surface pattern, where the circumferential and longitudinal members press into the surface of the food product so that the food product bulges outwardly within the square or rectangle formed by the longitudinal and circumferential members.

In addition to the appearance, it is also desirable, particularly in relation to the cooking or curing process, to maintain a desirable shape, and to apply constant compressive force to the meat product during the cooking or curing process. The constant pressure ensures that air pockets do not readily form within the meat, as this may lead to spoilage. It is also desirable to ensure that, particularly during a process where the meat product is hung to cure, no elongation or stretching of the meat product occurs.

In some instances, during a curing process, the weight of the meat product can cause the netting to stretch, thus resulting in a conical or tapered section from the hanging point to the beginning of the meat product. In many instances, depending on the type of the meat product, a small conical section of meat can be formed at the upper end. This particular section tends to be unsightly when the netting is removed, and is normally cut away and wasted.

This problem results from the fact that elastic netting is normally non-elastic in the longitudinal direction. Only the circumferential members, which form a continuous spiral, are normally formed from elastic material. The longitudinal members are formed from conventional chain stitching. Apart from the normal stretch which results from the knitting process, the netting is generally inextensible in the longitudinal direction. Accordingly, as there is no longitudinal elasticity, stretching and thinning at the upper end of the netting will occur during the curing process.

SUMMARY AND OBJECTS OF THE INVENTION

Therefore, it is an object of this invention to overcome the abovementioned problem and to provide netting which is elastically extensible in the longitudinal direction.

In its broadest form, the invention comprises an improved stitch for forming a casing of tubular netting, in which the casing comprises circumferential elastic members formed from at least one continuous spiral or a plurality of separate circular loops, and longitudinal members formed from a plurality of chain stitches interconnecting adjacent loops of the spiral or separate loops of said circumferential elastic members, resulting in a net-like appearance, the longitudinal chain stitches being attached to the circumferential elastic members such that, at each connection point of the chain stitching to an elastic member, a first chain stitch is attached to the elastic member and a further pair of chain stitches is attached to the elastic member and spaced either side of said first chain stitch such that, when said first and further pair of chain stitches are stretched, the first chain stitch is caused to pull on the section of the elastic member located between said further pair of chain stitches such that elastic deformation of the elastic member in the direction of said stretch occurs.

The yarn used to form the stitches may comprise a single filament, or instead may be a multi-filament yarn.

In a preferred embodiment, the first chain stitch extends to one side of the elastic member to which it is attached, along the longitudinal axis of the casing, and the further pair of chain stitches extends to the opposite side of said elastic member.

The centre pull effect of the first chain stitch between the further pair of chain stitches results in the pair of stitches separating from each other (rather than being drawn together), with the elastic member being stretched into a U-shape. Although only a small amount of deformation is achieved, the deformation of each of the loops of the circumferential members along the length of the netting will result in quite a considerable elastic extension. It would normally be expected that a conventional netting will extend by approximately 10%. It has been found that the netting of the abovedescribed invention will in fact extend by up to 50%.

The important feature is of course that the extension is elastic, which results in considerable longitudinal force being applied to any meat product placed within. This constant longitudinal pressure prevents or reduces any localised thinning of the meat product, particularly in the upper region of the netting adjacent to the suspension point.

The important aspect of the invention is deformation of the elastic member in the direction of the longitudinal axis of the tube of netting. This may be achieved in numerous means, such as staggering the longitudinal stitches between adjacent loops of the circumferential members so that the longitudinal stitches do not form a continuous line along the longitudinal axis of the casing, but are offset with respect to one another so that the necessary deformation of the elastic member occurs. Alternatively, the longitudinal members may in fact be substantially in line, but a pair of chain stitches to one side of the elastic member may form substantially a V-shape so that the stitches are spaced either side of said first chain stitch.

Preferably, a stitch or knot is formed at the point where the first chain stitch attaches to the elastic member. The knot tightens upon longitudinal tension being applied, and prevents any shortening or movement of threads associated with the pair of chain stitches to either side. This in turn ensures that the first chain stitch will pull against the elastic member rather than transferring any of the longitudinal force to the pair of chain stitches at either side.

In addition it has been found that stitching according to this invention produces a product that feels soft to the touch as a result of being a much bulkier knit. This is important in respect of repetitive manual handling of the product in that it is easier to use over extended periods of handling.

A further problem with the manufacture of netting is the production rate. Clearly, it is desirable to achieve the highest possible production rate for a given product. However, one of the main factors limiting the production rate is the speed at which the knitting machine operates. Clearly, for a given design of stitch or orientation of netting, there is a maximum speed at which a machine may operate, which of course results in a maximum production rate that cannot be increased.

Accordingly, it is a further object of this invention to provide a means whereby the production rate of netting can be increased.

In this further aspect of the invention, the netting comprises two or more elastic threads forming two or more separate circumferential spirals.

It has been found that knitting machines commonly used to produce the netting are able to produce longitudinal stitches at quite high rates. The factor that dictates the speed at which these longitudinal stitches are formed is the rate at which the circumferential members are introduced into the netting. Accordingly, by introducing more than one circumferential spiral into the netting at a time, the rate can be effectively doubled or trebled by increasing the circumferential members to two or three separate spiral-forming threads.

BRIEF DESCRIPTION OF THE DRAWING

In order for the invention to be more readily understood, the invention will now be described with respect to a preferred embodiment, which is illustrative but not restrictive of the present invention. This preferred embodiment is illustrated in the accompanying representations in which.

DETAILED DESCRIPTION OF A PREFERRED EMBODIMENT

Figure 1:
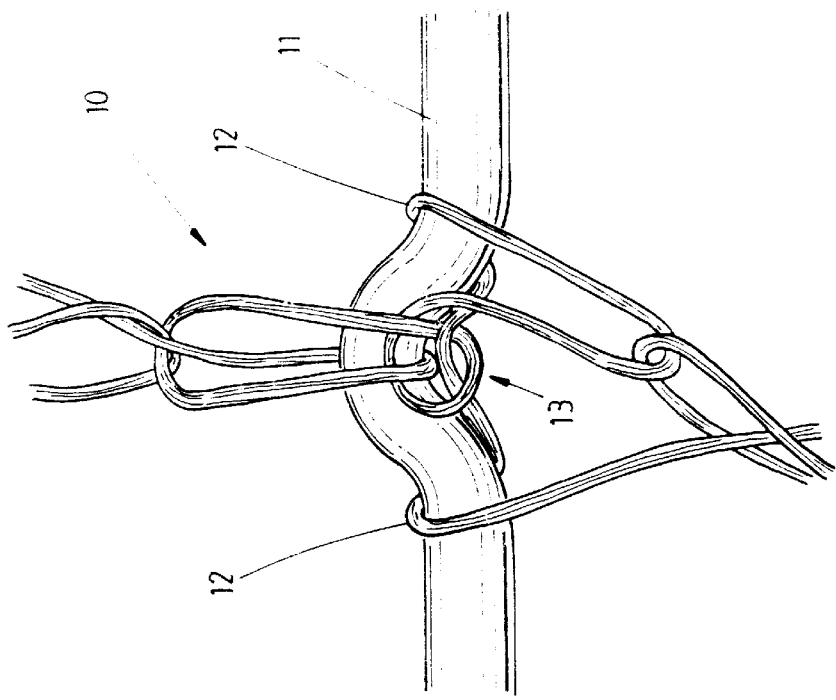
FIG. 1 shows an expanded view of a connection point between the longitudinal stitches and the elastic member.

As seen in FIG. 1, a first chain stitch 10 is attached to an elastic member 11 and extends transversely to one side of elastic member 11. A pair of chain stitches 12 are also attached to the elastic member 11 and extend transversely to the opposite side of elastic member 11. The pair of chain stitches 12 are spaced either side of the first chain stitch 10. A knot 13 is formed which, when placed under longitudinal stress or tension, acts to fix the first chain stitch 10 with respect to the elastic member 11. This knot prevents any tensile forces being transferred via the thread to the pair of chain stitches 12 that would cause the pair of chain stitches 12 to slide together.

Figure 2:
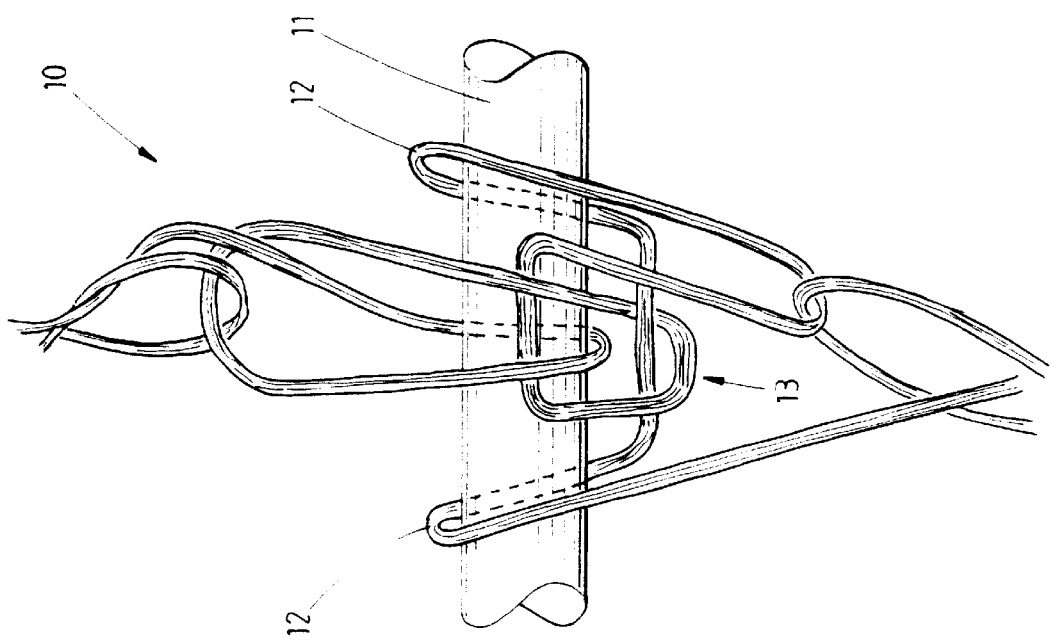
FIG. 2 shows the stitches illustrated in FIG. 1 under longitudinal stress or tension.

As seen in FIG. 2, when placed under tension, the knot 13 tightens around the elastic member 11 and the first chain stitch 10 is effectively tied to the elastic member. Therefore, although the stitches are formed from one continuous length of thread, the tension is not transferred to the pair of chain stitches 12. Accordingly, they remain in place either side of the first chain stitch 10, which in turn results in the elastic member 11 between the pair of chain stitches 12 being pulled into a U-shape. Accordingly, the first chain stitch 10 pulls away from the pair of chain stitches 12 under elastic tension and, although the extent of movement is minor, the cumulative effect along the length of the netting will result in quite significant extension. The extension is of course elastic, and therefore a longitudinal compressive force will be applied while the netting remains in an extended form.

It has been found by the Applicant that the particular type of stitch illustrated in FIGS. 1 and 2 is ideally suited to use with multiple threads forming the circumferential members. Accordingly, the stitches illustrated in FIGS. 1 and 2 may be used with two or more separate threads forming the circumferential spirals.

Figure 3:
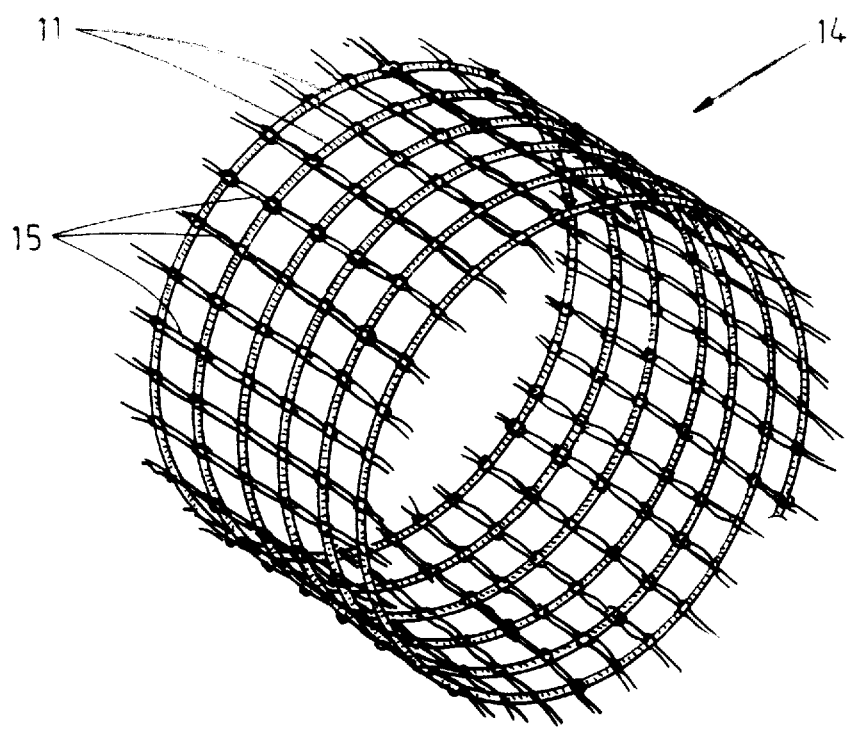
FIG. 3 is a perspective view of a section of the tubular casing.

FIG. 3 is a perspective view of a section of tubular casing 14, incorporating the system of stitching shown in FIGS. 1 and 2. Circumferential elastic members 11 and longitudinal members 15, formed from chain stitches 10 and 12, combine to form a netting product which is elastically extensible in the longitudinal direction.

As will be seen from the above description, the invention provides a significant improvement over known inextensible netting or net casings. This will provide a significant advantage in respect of the production of certain meat products.

While the present invention has been described in terms of a preferred embodiment in order to facilitate better understanding of the invention, it should be appreciated that various modifications can be made without departing from the principles of the invention. Therefore, the invention should be understood to include all such modifications within its scope.

I claim:

1. An improved stitch for forming a casing of tubular netting, in which the casing comprises circumferential elastic members formed from at least one continuous spiral or a plurality of separate circular loops, and longitudinal members formed from a plurality of chain stitches interconnecting adjacent loops of the spiral or separate loops of said circumferential elastic members, resulting in a net-like appearance, the longitudinal chain stitches being attached to the circumferential elastic members such that, at each connection point of the chain stitching to an elastic member, a first chain stitch is attached to the elastic member and a further pair of chain stitches is attached to the elastic member and spaced either side of said first chain stitch such that, when said first and further pair of chain stitches are stretched, the first chain stitch is caused to pull on the section of the elastic member located between said further pair of chain stitches such that elastic deformation of the elastic member in the direction of said stretch occurs.

2. An improved stitch according to claim 1 wherein said first chain stitch extends to one side of the elastic member to which it is attached, along the longitudinal axis of said casing, and said further pair of chain stitches extends to the opposite side of said elastic member.

3. An improved stitch according to claim 1 or claim 2, wherein said first chain stitch and said further pair of chain stitches are offset with respect to each other, rather than forming a continuous line along the longitudinal axis of said casing.

4. An improved stitch according to claim 1 or claim 2, wherein said further pair of chain stitches forms substantially a V-shape with the stitches spaced to either side of said first chain stitch.

5. An improved stitch according to any one of claims 1 to 4, wherein a stitch or knot, which tightens upon application of tension or stress in a direction transverse to the longitudinal axis of said elastic members, is formed at the point where said first chain stitch attaches to the elastic member.

6. An improved stitch according to any one of claims 1 to 5, wherein said circumferential elastic members comprise two or more continuous elastic threads forming two or more separate circumferential spirals.

7. An improved stitch according to claims 1 or 2, wherein the casing is a casing for a food product.

8. An improved stitch according to claim 7, wherein the casing is a casing for a meat product.

\* \* \* \* \*